(12) United States Patent
Hwangbo et al.

(10) Patent No.: US 11,650,295 B2
(45) Date of Patent: May 16, 2023

(54) LIGHT DETECTION AND RANGING DEVICE WITH A DIVERGING AND CONVERGING MEMBER WHERE THE CONVERGING MEMBER INCLUDES A PLURALITY OF REFLECTORS

(71) Applicant: SAMSUNG ELECTRONICS CO., LTD., Suwon-si (KR)

(72) Inventors: Minsu Hwangbo, Suwon-si (KR); Myungsik Kim, Suwon-si (KR); Hyunseok Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 578 days.

(21) Appl. No.: 16/743,343

(22) Filed: Jan. 15, 2020

(65) Prior Publication Data

US 2020/0225331 A1 Jul. 16, 2020

(30) Foreign Application Priority Data

Jan. 16, 2019 (KR) .................. 10-2019-0005862

(51) Int. Cl.
*G01S 7/481* (2006.01)

(52) U.S. Cl.
CPC ............ *G01S 7/4817* (2013.01); *G01S 7/481* (2013.01); *G01S 7/4813* (2013.01); *G01S 7/4814* (2013.01); *G01S 7/4816* (2013.01)

(58) Field of Classification Search
CPC .... G01S 7/4817; G01S 7/4814; G01S 7/4816; G01S 7/4813; G01S 7/4815; G01S 7/481; G02B 27/18; G02B 26/105; H02K 7/116
See application file for complete search history.

(56) References Cited

U.S. PATENT DOCUMENTS

| 5,337,189 A | * | 8/1994 | Krawczyk | ............. G02B 26/10 356/28.5 |
| 5,383,022 A | | 1/1995 | Käser | |

(Continued)

FOREIGN PATENT DOCUMENTS

| JP | 6309754 | 4/2018 |
| JP | 2017-138298 | 8/2018 |

(Continued)

OTHER PUBLICATIONS

International Search Report and Written Opinion dated Apr. 22, 2020 in counterpart International Patent Application No. PCT/KR2020/000680.

(Continued)

*Primary Examiner* — Jennifer D Bennett
(74) *Attorney, Agent, or Firm* — Nixon & Vanderhye P.C.

(57) ABSTRACT

Provided is a light detection and ranging (LIDAR) device. The LIDAR device includes: a light source configured to emit a first light beam; a photodetector configured to detect a second light beam, the second light beam being a reflected or scattered light beam of the first light beam reflected or scattered by an object; a diverging member comprising a reflective material configured to diverge the first light beam in various directions by rotating about a rotation axis; and a converging member including an optical element including one or more of a refractive and/or reflective material configured to converge the second light beam from the object and configured to cause the second light beam to be incident on the photodetector.

12 Claims, 12 Drawing Sheets

(56) References Cited

U.S. PATENT DOCUMENTS

| | | | |
|---|---|---|---|
| 5,506,719 | A | 4/1996 | Murakami et al. |
| 5,949,530 | A | 9/1999 | Wetteborn |
| 7,510,118 | B2 | 3/2009 | Ralph et al. |
| 7,823,786 | B2 | 11/2010 | Oliva et al. |
| 8,996,172 | B2 | 3/2015 | Shah et al. |
| 9,110,472 | B2 | 8/2015 | Ahn et al. |
| 9,618,742 | B1 | 4/2017 | Droz et al. |
| 9,810,626 | B2 | 11/2017 | Kramer et al. |
| 10,545,223 | B2 | 1/2020 | Hayakawa et al. |
| 2001/0035946 | A1* | 11/2001 | Nakase .................... G01S 17/42 356/4.01 |
| 2005/0024625 | A1* | 2/2005 | Mori ....................... G01S 17/42 356/4.01 |
| 2008/0088818 | A1* | 4/2008 | Mori ....................... G01S 17/10 356/5.1 |
| 2009/0002678 | A1* | 1/2009 | Tanaka ..................... G02B 5/09 356/4.01 |
| 2014/0198308 | A1* | 7/2014 | Kim ...................... G01S 7/4817 356/4.01 |
| 2014/0240691 | A1* | 8/2014 | Mheen .................... G01S 17/89 356/4.07 |
| 2015/0268346 | A1* | 9/2015 | Nakamura .............. G01S 17/66 356/5.04 |
| 2017/0350983 | A1 | 12/2017 | Hall et al. |
| 2018/0143322 | A1 | 5/2018 | Rosenzweig et al. |
| 2018/0284282 | A1 | 10/2018 | Hong et al. |
| 2018/0284285 | A1 | 10/2018 | Curatu |
| 2019/0079281 | A1* | 3/2019 | Maruyama ............ G01S 7/4817 |

FOREIGN PATENT DOCUMENTS

| | | |
|---|---|---|
| KR | 10-2018-0058067 | 5/2018 |
| KR | 10-2018-0068714 | 6/2018 |

OTHER PUBLICATIONS

Notice of Allowance dated Jun. 28, 2021 in corresponding Korean Patent Application No. 10-2019-0005862.

* cited by examiner

LIGHT DETECTION AND RANGING DEVICE WITH A DIVERGING AND CONVERGING MEMBER WHERE THE CONVERGING MEMBER INCLUDES A PLURALITY OF REFLECTORS

CROSS-REFERENCE TO RELATED APPLICATION

This application is based on and claims priority under 35 U.S.C. § 119 to Korean Patent Application No. 10-2019-0005862, filed on Jan. 16, 2019, in the Korean Intellectual Property Office, the disclosure of which is incorporated by reference herein in its entirety.

BACKGROUND

1. Field

The disclosure relates to a light detection and ranging (LIDAR) device.

2. Description of Related Art

There is an increasing interest in techniques of measuring distances or directions to objects using light (or beams). In relation to this, studies have been performed on methods of steering directions of light beams generated from light sources or methods of receiving light beams from intended directions, that is, light-beam scanning methods.

To scan light-beams in intended directions, generally, methods of mechanically rotating light sources or optical elements, and methods of using the interference of a bundle of light beams coming out of a large number of unit cells or a large number of waveguides using an optical phased array (OPA) method have been used. In the OPA method, the direction of beams may be changed by electrically or thermally controlling unit cells or waveguides. In the OPA method, because a large number of waveguides are required, the overall volume required is large, and errors may occur in modulating phases. In addition, a plurality of light sources are required to provide light beams to respective waveguides.

SUMMARY

Embodiments of the disclosure provide a light detection and ranging (LIDAR) device capable of scanning a light beam in various directions (for example, in omnidirections).

Additional aspects will be set forth in part in the description which follows and, in part, will be apparent from the description.

According to an example embodiment of the disclosure, a light detection and ranging (LIDAR) device includes: a light source configured to emit a first light beam; a photodetector configured to detect a second light beam, the second light beam being a reflected or scattered light beam of the first light beam reflected or scattered by an object; a diverging member comprising a reflective surface configured to diverge the first light beam in various directions by rotating about a rotation axis, the first light beam being incident on the diverging member from the light source; a converging member comprising an optical element comprising at least one of a refractive or reflective material configured to converge the second light beam from the object and causing the second light beam to be incident on the photodetector; and a processor configured to obtain location information of the object based on a detection result of the photodetector.

The diverging member may include a reflective surface that is asymmetrical with respect to the rotation axis.

The reflective surface may be tilted at a certain angle with respect to the rotation axis, and the first light beam may be incident on the reflective surface while being parallel to the rotation axis.

The photodetector may be arranged on the rotation axis and remain fixed while the diverging member rotates.

The LIDAR device may further include a driving member comprising a motor configured to rotate the diverging member.

The LIDAR device may further include a housing including a top surface and a side surface, the top surface contacting the diverging member, and the side surface contacting the driving member.

The driving member may include: a motor; a first gear connected to the motor and rotated by the motor; and a second gear arranged on the side surface of the housing and rotating the housing based on a rotation of the first gear while being engaged with the first gear.

The light source, the photodetector, the diverging member, and the converging member may be arranged in an internal space of the housing.

The LIDAR device may further include a light blocking member comprising a light blocking material arranged between the diverging member and the converging member in the internal space of the housing.

The light blocking member may include a hole through which the first light beam is transmitted to the diverging member, the first light beam being emitted from the light source.

The housing may include a portion including a transparent material.

The converging member may include a fisheye lens having an angle of view of 180 degrees or more.

A central axis of the fisheye lens may be aligned with a central axis of the photodetector and may not be aligned with the rotation axis.

The converging member may include a plurality of reflectors comprising a reflective material configured to reflect the second light beam to be incident on the photodetector.

The plurality of reflectors may include: a first reflector arranged on the side surface of the housing and configured to reflect the second light beam toward a lower portion of the housing; a second reflector arranged under the first reflector and configured to reflect the second light beam to an internal space of the housing, the second light beam being incident on the second reflector from the first reflector; and a third reflector arranged in the internal space of the housing and configured to reflect the second light beam to the photodetector, the second light beam being incident on the third reflector from the second reflector.

The third reflector and the photodetector may be arranged on the rotation axis.

The first reflector may be configured to rotate in correspondence with the diverging member, and the third reflector may be configured to remain fixed in correspondence with the photodetector.

The diverging member may be configured to reflect the second light beam, which is incident thereon from the object, to the converging member, and the converging member may include a fourth reflector configured to reflect the second light beam, which is incident thereon from the diverging member, to the photodetector.

The fourth reflector may be configured to rotate about the rotation axis.

The processor may be further configured to determine at least one of a direction of the object, a height of the object, or a distance to the object, the direction of the object being based on a rotation direction of a reflective surface of the diverging member, the height of the object being based on a tilt angle of the reflective surface of the diverging member, and the distance to the object being based on detection time for the photodetector to detect the second light beam.

BRIEF DESCRIPTION OF THE DRAWINGS

The above and other aspects, features, and advantages of certain embodiments of the disclosure will be more apparent from the following detailed description, taken in conjunction with the accompanying drawings, in which.

DETAILED DESCRIPTION

Figure 1:
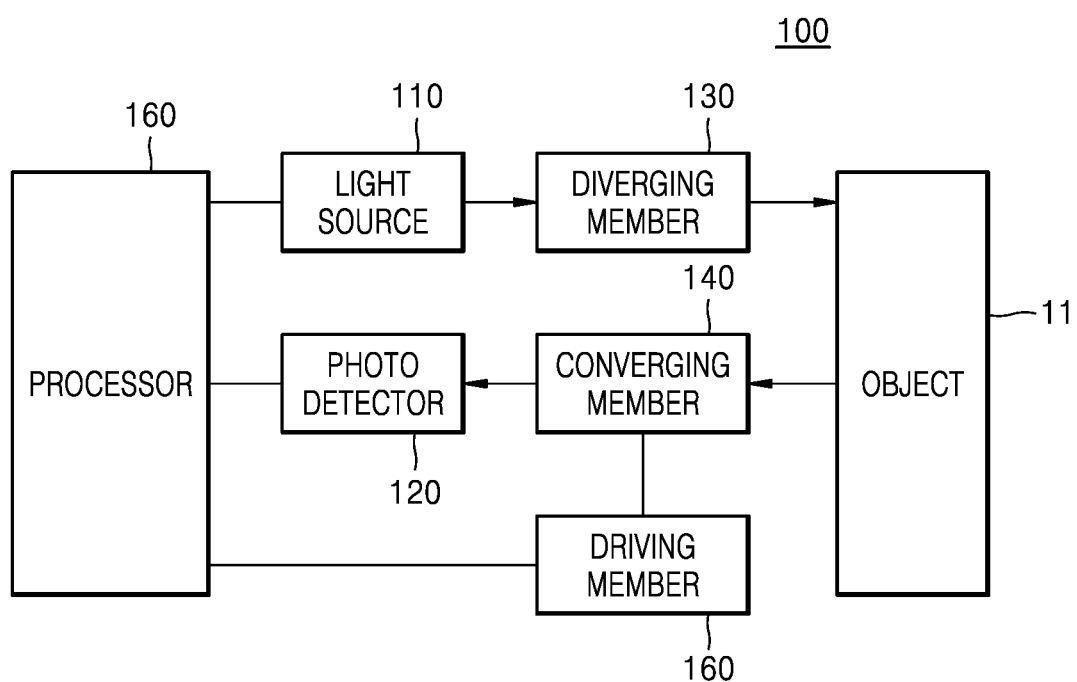
FIG. 1 is a block diagram illustrating an example light detection and ranging (LIDAR) device according to an embodiment of the disclosure.

Hereinafter, various example embodiments of the disclosure will be described in greater detail with reference to the accompanying drawings, the same reference numerals are given to the same or corresponding components throughout the disclosure, and repeated descriptions thereof may not be provided.

It should be understood that terms such as "comprises", "comprising", "includes", and "including", when used herein, specify the presence of stated features, numbers, steps, operations, components, parts, or combinations thereof, but do not preclude the presence or addition of one or more other features, numbers, steps, operations, components, parts, or combinations thereof.

As used herein, terms such as "upper side" and "lower side" are defined with reference to the accompanying drawings, and thus, it will be understood that the term "upper side" can be used interchangeably with the term "lower side". In addition, it will be understood that, when an element such as a layer or component is referred to as being placed "on" or "under" another element, it can be directly placed on or under the other element, or an intervening layer(s) may also be present. Hereinafter, various example embodiments of the disclosure will be described in greater detail with reference to the accompanying drawings, and it should be understood that these embodiments of the disclosure are provided for illustrative purposes only.

Throughout the disclosure, the expression "at least one of a, b or c" indicates only a, only b, only c, both a and b, both a and c, both b and c, all of a, b, and c, or variations thereof.

It will also be understood that, although the terms such as "first", "second" and the like may be used herein to describe various components, these components should not be limited by these terms. These terms are used only to distinguish one component from another component.

Figure 2:
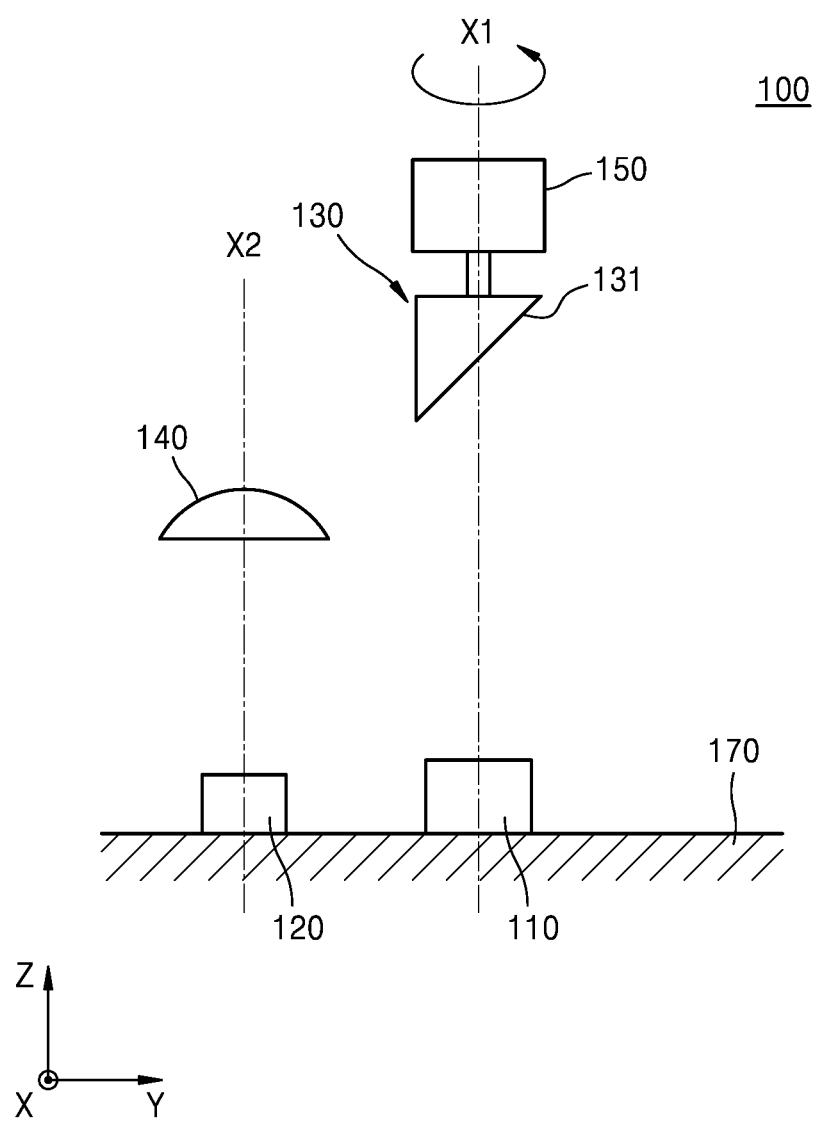
FIG. 2 is a diagram illustrating an example optical arrangement of the example LIDAR device of FIG. 1 according to an embodiment of the disclosure.

FIG. 1 is a block diagram illustrating an example light detection and ranging (LIDAR) device 100 according to an embodiment of the disclosure, and FIG. 2 is a diagram illustrating an example optical arrangement of the LIDAR device 100 of FIG. 1 according to an embodiment of the disclosure. Referring to FIGS. 1 and 2, the LIDAR device 100 may include a light source 110 configured to emit a first light beam L1, and a photodetector 120 configured to detect a second light beam L2, which is a reflected or scattered light beam of the first light beam L1 due to reflection or scattering of the first light beam L1 by an object 11.

The light source 110 may be a device emitting light. For example, the light source 110 may emit light in an infrared range. Use of light in the infrared range may prevent and/or reduce mixing with natural light including sunlight and visible-range light. However, the range of light emitted from the light source 110 is not limited to the infrared range, and the light source 110 may emit light in various wavelength ranges. In this case, compensation for removing information of added natural light may be required.

The light source 110 may, for example, be a laser light source and is not limited to a particular example. The light source 110 may, for example, and without limitation, be one of an edge emitting laser, a vertical-cavity surface emitting laser (VCSEL), a distributed feedback laser, or the like. For example, the light source 110 may be a laser diode.

The photodetector 120 may convert the second light beam L2 into, for example, a current, the second light beam L2 being a reflected or scattered light beam of the first light beam L1 due to the reflection or scattering of the first light beam L1 by an object 11. The first light beam L1 emitted from the light source 110 may be irradiated onto the object 11 and may be reflected or scattered by the object 11. A light beam of the first light beam L1 due to the reflection or scattering of the first light beam L1 by an object 11 is referred to as the second light beam L2. The first light beam L1 may be equal in wavelength to the second light beam L2 and may be different in intensity from the second light beam L2.

The photodetector 120 may include, for example, one or more pixels. A pixel may refer, for example, to a light receiving element and may output an electrical signal, for example, a current, corresponding to the second light beam L2. The pixel may, for example, be a light receiving element operating in a state of the application of a bias voltage. For example, the photodetector 120 may include an avalanche photodiode (APD) or a single photon avalanche diode (SPAD), or the like. The photodetector 120 may have a different configuration of circuit components such as an analog front-end (AFE) and a time digital counter (TDC) according to which light receiving element out of an APD and an SPAD is included in the photodetector 120. Because such a configuration of circuit components may be a general technique, detailed descriptions thereof may not be provided. A distance to the object 11 may be calculated based on light emission time of the light source 110 and light detection time of the photodetector 120.

In the photodetector 120, a plurality of pixels may, for example, be arranged in an array form. The plurality of pixels may, for example, be arranged in a matrix form. Each of the pixels may include a light receiving element and may output an electrical signal, for example, a current, corresponding to the second light beam L2. The direction or height of the object 11 may be determined based on a position of a pixel detecting the second light beam L2 among the pixels.

The photodetector 120 may further include a current-to-voltage circuit configured to convert an output current into a voltage, and an amplifier configured to amplify the amplitude of a voltage. In addition thereto, the photodetector 120 may further include a lens which concentrates the second light beam L2 reflected or scattered by the object 11, and a filter, for example, a high-pass filter, which filters an electrical signal having a particular frequency.

The LIDAR device 100 may further include a diverging member (e.g., comprising a reflective material) 130 diverging a light beam, which is incident thereon from the light source 110, in omnidirection by rotating about a rotation axis X1.

The diverging member 130 may include a reflective surface 131 comprising a reflective material tilted at a certain angle with respect to the rotation axis X1. The reflective surface 131 may be asymmetrical with respect to the rotation axis X1. A tilt angle of the reflective surface 131 may be an angle between the rotation axis X1 and the reflective surface 131. In addition, the diverging member 130 may be arranged over the light source 110. For example, a central axis of the light source 110 may be consistent with the rotation axis X1 of the diverging member 130. Therefore, even when the light source 110 emits light in a vertical direction, a rotation angle of the reflective surface 131 is changed as the diverging member 130 rotates. Accordingly, a divergence direction of the first light beam L1 emitted from the light source 110 may vary according to the rotation angle of the reflective surface 131. The rotation angle may be an angle between the reflective surface 131 and a reference plane including the rotation axis X1.

Because the rotation angle becomes 360 degrees when the diverging member 130 rotates once, the first light beam L1 emitted from the light source 110 may diverge in various directions (for example, omnidirection) from the viewpoint of a lateral direction of the diverging member 130. For example, the light source 110 may diverge the first light beam L1 in various directions by the rotation of the diverging member 130 while being fixed to a base plate 170.

The reflective surface 131 may be formed using a material exhibiting high reflectivity. A material that may be used for the reflective surface 131 may include, for example, and without limitation, a white resin, a metal, a reflective paint, or the like, which exhibits high reflectivity. The white resin may include, for example, and without limitation, a white foamed polyethylene terephthalate (PET) material, a white polycarbonate material, or the like. The reflectivity of such a material may, for example, be about 97%, and such a material may exhibit low deterioration of efficiency due to low reflection loss of light. The metal that may be used for the reflective surface 131 may include, for example, and without limitation, at least one selected from the group consisting of high-reflectivity metals, for example, Ag, Al, Au, Cu, Pd, Pt, and Rd. The reflective surface 131 may be formed by deposition. The reflective paint that may be used for the reflective surface 131 may include a reflective material, such as, for example, and without limitation, titanium oxide ($TiO_2$), zinc oxide (ZnO), calcium carbonate ($CaCO_3$), or the like, which has a reflectivity of about 80% to about 90%, and these reflective materials may be used alone or in combination. The reflective paint may be diluted, together with an adhesive, in a solvent and then applied onto a material such as plastic, thereby forming the reflective surface 131. As for an application method, the reflective paint may, for example, and without limitation, be applied using a spray, a roller, or the like.

The diverging member 130 may include, for example, and without limitation, at least one of an inverted cone shape, an inverted semi-spherical shape, an inverted semi-elliptical cone shape, or the like. In addition, a cross-section of the diverging member 130 may include, for example, and without limitation, at least one of a circular shape, a polygonal shape, an elliptical shape, or the like. Although FIG. 1 illustrates that the shape of the diverging member 130 is an inverted cone shape, the disclosure is not limited thereto.

The LIDAR device 100 may further include a converging member (e.g., including an optical element comprising one or more of a refractive and/or reflective material) 140 converging the second light beam L2 from the object 11 and causing the second light beam L2 to be incident on the photodetector 120. A central axis X2 of the converging member 140 may be consistent with a central axis of the photodetector 120. As shown in FIG. 1, the converging member 140 may include, for example, a fisheye lens (e.g., a refractive optical element) with an optical angle of 180 degrees or more. Because the fisheye lens has an optical angle of 180 degrees or more, the fisheye lens may refract the second light beam L2 incident thereon from various lateral directions and thus cause the second light beam L2 to be incident on the photodetector 120. The central axis X2 of the fisheye lens may be consistent with the central axis of the photodetector 120 and may not be consistent with the rotation axis X1.

The LIDAR device 100 may further include a driving member (e.g., including a motor) 150 configured to rotate the diverging member 130. The driving member 150 may include a motor. An axis of the motor may be the rotation axis X1 of the diverging member 130. The driving member 150 may further include other rotation elements in addition to the motor.

The processor 160 may include various processing circuitry and determine location information of the object 11 using a detection result of the photodetector 120. The location information of the object 11 may include at least one of a direction, a height, or a distance of the object 11.

When the photodetector 120 includes a plurality of pixels, the processor 160 may determine at least one of the direction or height of the object 11 using a location of a pixel of the photodetector 120, which detects light, and may determine the distance to the object 11 using light detection time of the pixel.

The processor 160 may determine the direction of the object 11 by an azimuthal angle of a pixel of the photodetector 120, which detects the second light beam L2. The processor 160 may determine the height of the object 11 (for example, a height from a floor surface to the object 11) by a distance from the pixel detecting the second light beam L2 to a reference point of the photodetector 120 (for example, a point at which the rotation axis X1 intersects the photodetector 120). For example, the processor 160 may determine that the height of the object 11 is greater as a distance between the reference point and the pixel having made the detection is greater.

In addition, the processor 160 may detect a peak from an electrical signal applied from the photodetector 120. The processor 160 may detect the peak by detecting a central location of the electrical signal or may detect the peak by detecting the width of the electrical signal in an analog manner. The processor 160 may detect the peak by, for example, converting the electrical signal into a digital signal and detecting a rising edge and a falling edge of the digital signal or may detect the peak in, for example, a constant fraction discriminator (CFD) manner. The processor 160 may further include a comparator and thus may output the detected peak as a pulse signal.

The processor 160 may determine the distance to the object 11 using the detected peak. For example, the processor 160 may measure the distance to the object 11 using detection time of the detected peak and emission time of light emitted from the light source 110. Because a distance measuring method using a peak is a general technique, descriptions thereof will be omitted.

Because the processor 160 determines the distance to the object 11 using the light emission time of the light source 110 and the light detection time of the photodetector 120, there is no need to maintain a constant distance between the light source 110 and the photodetector 120, unlike in a triangulation method. Accordingly, the size reduction of the LIDAR device 100 may be achieved.

Even when the photodetector 120 includes one pixel, the processor 160 may calculate the location information of the object 11. A rotation speed of the diverging member 130 is relatively less than the speed of light. Therefore, the processor 160 may calculate the direction of the object 11 based on the rotation angle of the reflective surface 131 of the diverging member 130 and may calculate the height of the object 11 based on the tilt angle of the diverging member 130. In addition, the processor 160 may calculate the distance to the object 11 based on the light emission time of the light source 110 and the light detection time of the photodetector 120.

Figure 3A:
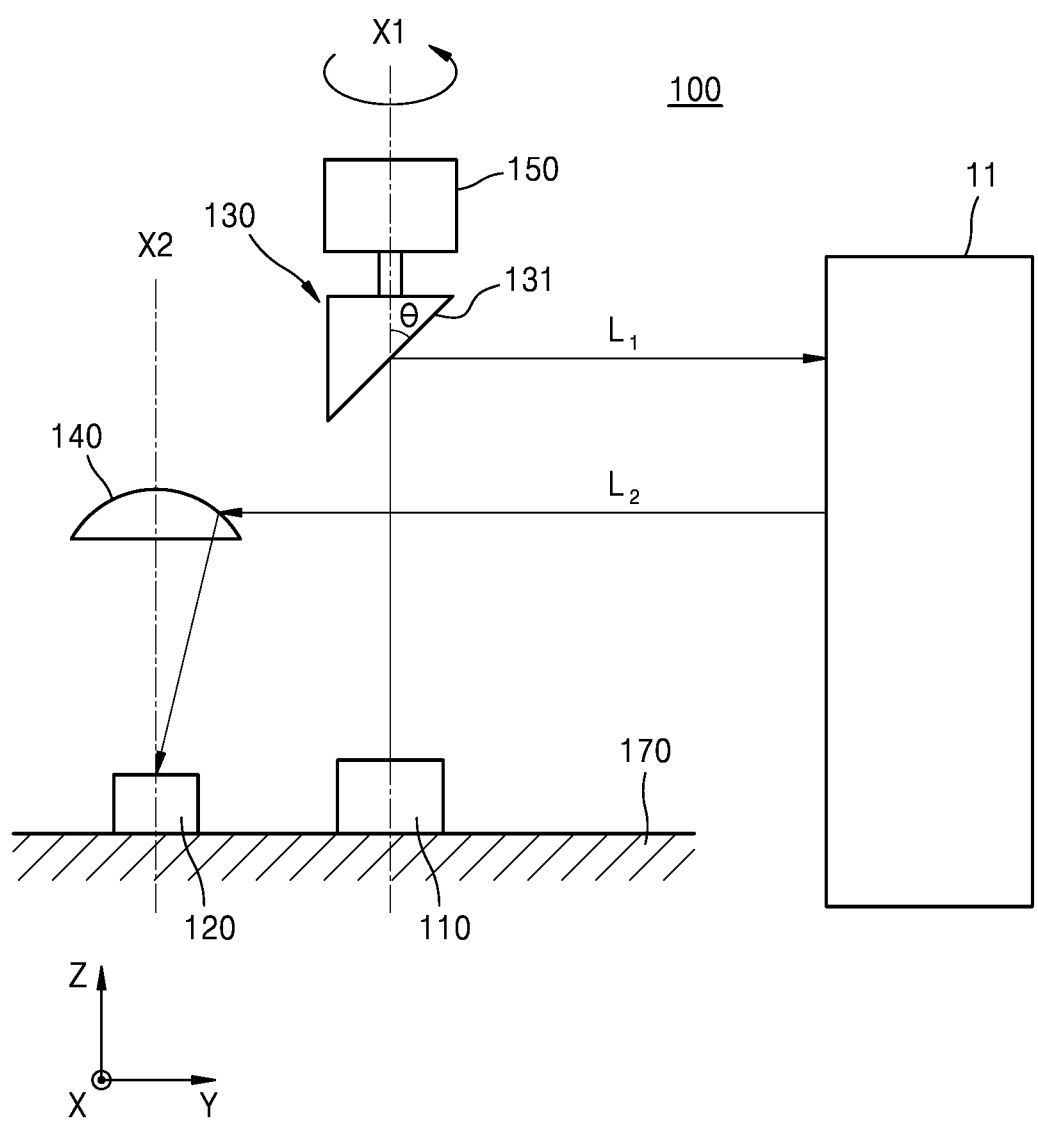
FIG. 3A is a diagram illustrating an example of the divergence and convergence of a light beam according to the rotation of a diverging member according to an embodiment of the disclosure.
Figure 3B:
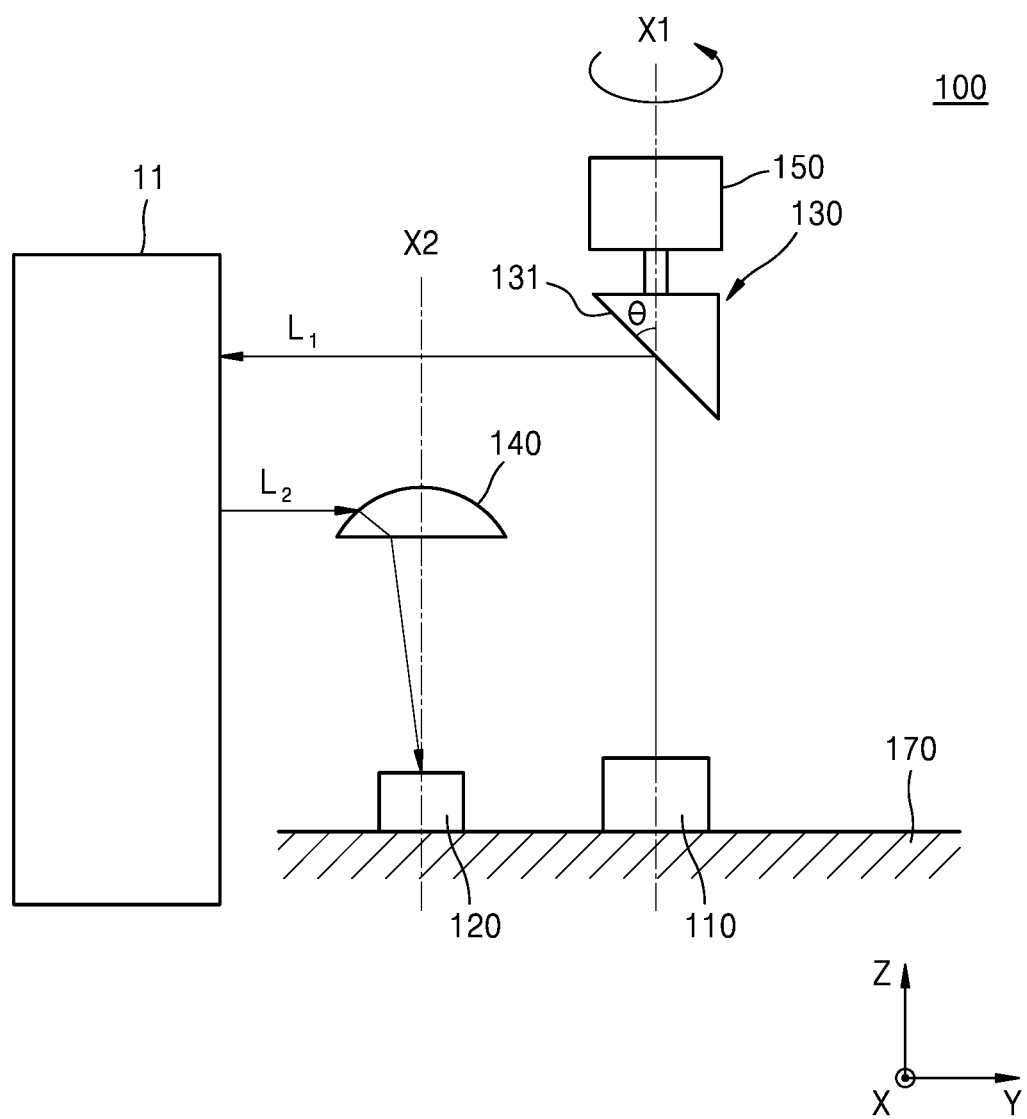
FIG. 3B is a diagram illustrating an example of divergence and convergence of a light beam according to the rotation of a diverging member according to an embodiment of the disclosure.

FIG. 3A is a diagram illustrating example divergence and convergence of light according to the rotation of the diverging member 130, according to an embodiment of the disclosure, and FIG. 3B is a diagram illustrating example divergence and convergence of light according to the rotation of the diverging member 130, according to an embodiment of the disclosure.

As shown in FIG. 3A, when the reflective surface 131 of the diverging member 130 is tilted in an upper-right direction with reference to the rotation axis X1, the first light beam L1 emitted from the light source 110 may be reflected by the reflective surface 131 and thus diverge toward the right side of the diverging member 130. The object 11 on the right of the diverging member 130 may apply the second light beam L2 to the converging member 140, the second light beam L2 being a reflected or scattered light beam of the first light beam L1 coming from the diverging member 130. The converging member 140 may apply the received light beam to the photodetector 120.

The diverging member 130 may rotate, and thus, the reflective surface 131 of the diverging member 130 may be tilted in an upper-left direction with reference to the rotation axis X1. Then, the first light beam L1 emitted from the light source 110 may be reflected by the reflective surface 131 and thus diverge toward the left side of the diverging member 130. The object 11 on the left of the diverging member 130 may apply the second light beam L2 to the converging member 140, the second light beam L2 being a reflected or scattered light beam of the first light beam L1 coming from the diverging member 130. The converging member 140 may apply the received light beam to the photodetector 120.

A light beam may diverge in various directions by the rotation of the diverging member 130 while the light source 110 is fixed to the base plate 170. In addition, when a fisheye lens is used as the converging member 140, the converging member 140 and the photodetector 120 may detect light beams received from all directions while being fixed. For example, the photodetector 120 may be fixed to the base plate 170 by contacting the base plate 170, and the converging member 140 may be fixed to the base plate 170 by way of a cylinder or the like (not shown).

Figure 4:
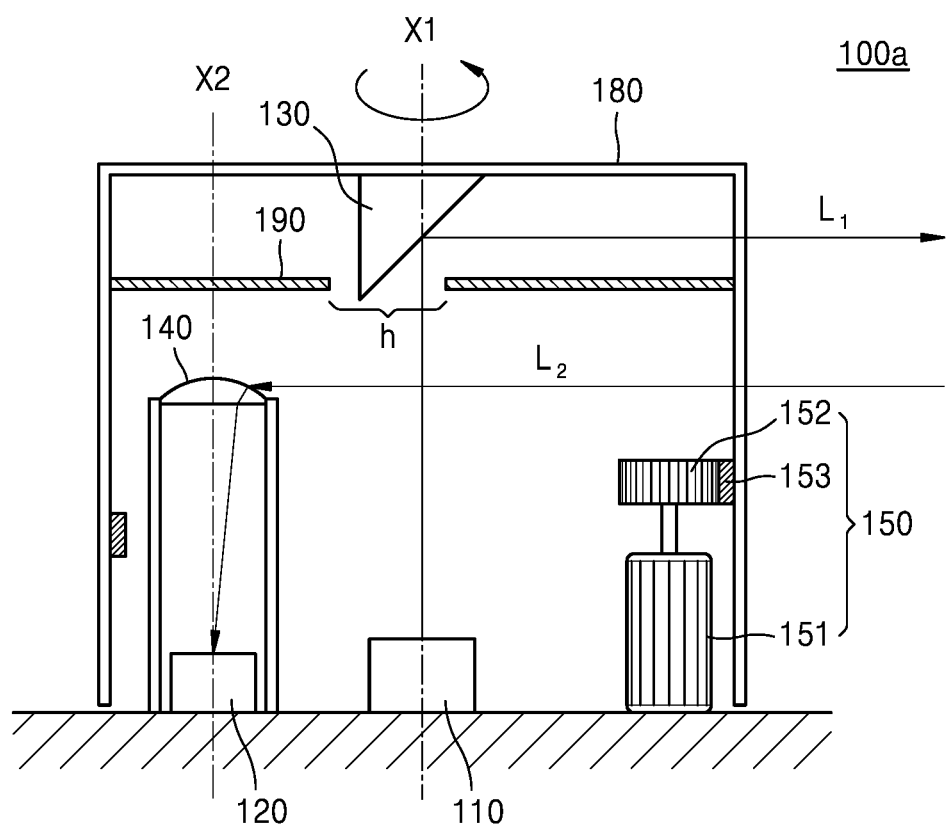
FIG. 4 is a diagram illustrating an example LIDAR device according to another embodiment of the disclosure.

FIG. 4 is a diagram illustrating an example LIDAR device 100a according to another embodiment of the disclosure. Comparing FIG. 1 with FIG. 4, the LIDAR device 100a of FIG. 4 may further include a housing 180 including a top surface and a side surface, the top surface contacting the diverging member 130, and the side surface contacting the driving member 150. The housing 180 may include a transparent material. However, the disclosure is not limited thereto. The top surface of the housing 180 may include an opaque material, and the side surface of the housing 180 may include a transparent material. Some areas of the side surface of the housing 180, for example, only both an area thereof on a travel path of light from the diverging member 130 and an area thereof on a travel path of light to the converging member 140, may include a transparent material, and the remaining area thereof may include an opaque material.

The diverging member 130 may contact the top surface of the housing 180. In addition, the driving member 150 may contact the side surface of the housing 180. The driving member 150 may include: a motor 151; a first gear 152 connected to the motor 151 and rotated by the motor 151; and a second gear 153 arranged on the side surface of the housing 180 and rotating the housing 180 according to the rotation of the first gear 152 by rotating while engaged with the first gear 152.

The light source 110, the photodetector 120, the diverging member 130, and the converging member 140 may be arranged in an internal space of the housing 180. The housing 180 may rotate the diverging member 130 by the driving member 150 and may simultaneously function as a case protecting the light source 110, the photodetector 120, the diverging member 130, and the converging member 140.

The LIDAR device 100 may further include a light blocking member (e.g., including a light blocking material)

190 arranged between the diverging member 130 and the converging member 140 in the internal space of the housing 180. The light blocking member 190 may include a hole h for transmitting the first light beam L1 to the diverging member 130, the first light beam L1 being emitted from the light source 110. The hole h may be arranged on the central axis of the light source 110, for example, the rotation axis X1. The light blocking member 190 may transmit a light beam (e.g., allow a light beam to pass), which is emitted from the light source 110, to the diverging member 130 and simultaneously prevent and/or reduce a light beam reflected by the diverging member 130 from being directly incident on the converging member 140, thereby reducing noise.

The converging member 140 may include a plurality of reflectors reflecting the second light beam L2 and thus causing the second light beam L2 to be incident on the photodetector 120.

Figure 5:
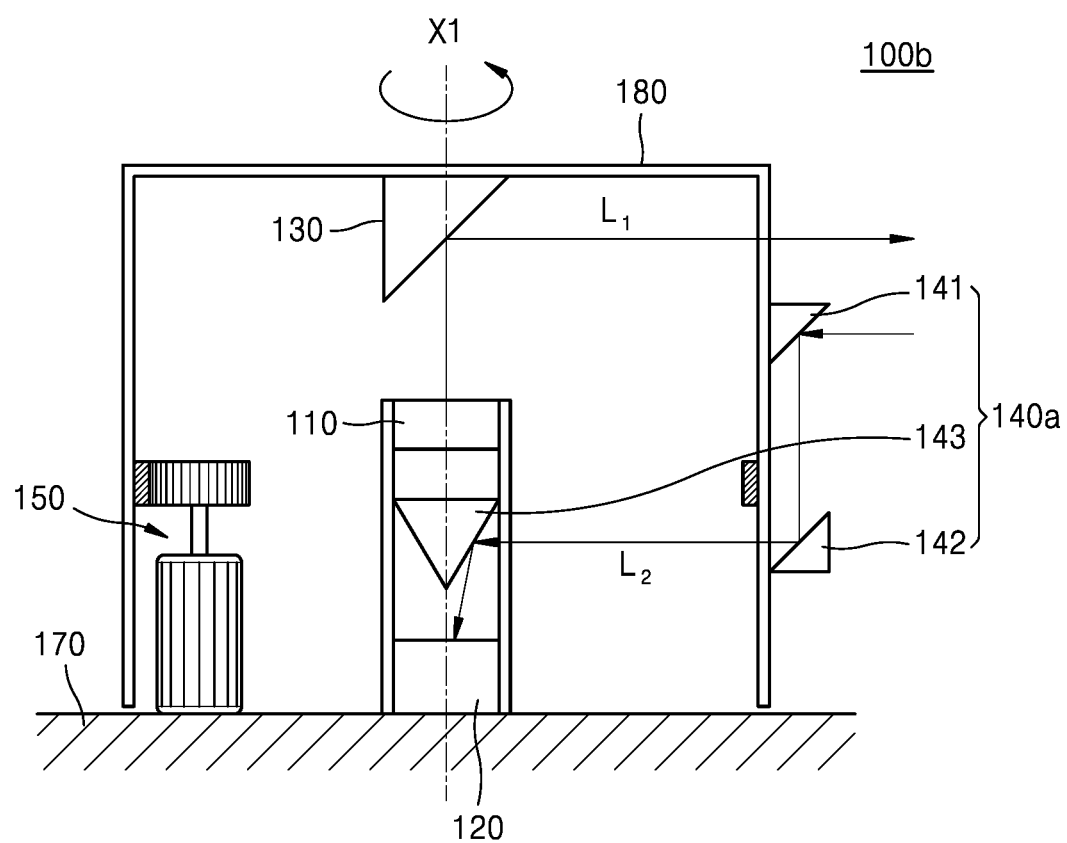
FIG. 5 is a diagram illustrating an example LIDAR device including a plurality of reflectors, according to an embodiment of the disclosure.

FIG. 5 is a diagram illustrating an example LIDAR device 100b including a plurality of reflectors, according to an embodiment of the disclosure. Comparing FIG. 4 with FIG. 5, the LIDAR device 100b of FIG. 5 includes a converging member 140a including a plurality of reflectors 141, 142, and 143 (hereinafter, also referred to as first, second, and third reflectors 141, 142, and 143).

For example, the converging member 140a may include: the first reflector 141 arranged on the side surface of the housing 180 and reflecting the second light beam L2 toward a lower side of the housing 180; the second reflector 142 arranged under the first reflector 141 and reflecting a light beam, which is incident on the second reflector 142 from the first reflector 141, to the internal space of the housing 180; and the third reflector 143 arranged in the internal space of the housing 180 and reflecting a light beam, which is incident on the third reflector 143 from the second reflector 142, to the photodetector 120.

A reflective surface of the first reflector 141 may be parallel to the reflective surface of the diverging member 130. For example, a tilt angle of the first reflector 141 may be substantially equal to the tilt angle of the diverging member 130. The first reflector 141 may have an inverted cone shape contacting one area of the housing 180. However, the disclosure is not limited thereto. The first reflector 141 may have a ring shape surrounding the side surface of the housing 180 from all directions.

A reflective surface of the second reflector 142 may be in a complementary relation to the reflective surface of the first reflector 141. For example, a tilt angle of the second reflector 142 may be greater than the tilt angle of the first reflector 141 by as much as about 180 degrees. The second reflector 142 may have a cone shape contacting one area of the housing 180. However, the disclosure is not limited thereto. The second reflector 142 may have a ring shape surrounding the side surface of the housing 180 from all directions.

The third reflector 143 may have a tapered shape having a decreasing width from top toward bottom. A reflective surface of the third reflector 143 may be symmetrical about the central axis X2 thereof. The reflective surface of the third reflector 143 may be in a complementary relation to the reflective surface of the second reflector 142. A central axis of the third reflector 143 may be consistent with the central axis of the photodetector 120 and may also be consistent with the rotation axis X1 of the diverging member 130. The light source 110, the third reflector 143, and the photodetector 120 may be fixed by a cylinder or the like in such a manner that the central axes of the light source 110, the third reflector 143, and the photodetector 120 are consistent with each other.

When the first and second reflectors 141 and 142 are arranged to contact only some areas of the housing 180, the first and second reflectors 141 and 142 may rotate in correspondence with the rotation of the diverging member 130 and thus receive the second light beam L2. However, when each of the first and second reflectors 141 and 142 has a shape surrounding the side surface of the housing 180, the first and second reflectors 141 and 142 may not contact the housing 180 and may not rotate. Because the reflective surface of the third reflector 143 is symmetrical about the rotation axis X1 and has a certain tilt angle, the reflective surface of the third reflector 143 may reflect the second light beam L2, which is incident thereon from various directions, to the photodetector 120.

Figure 6:
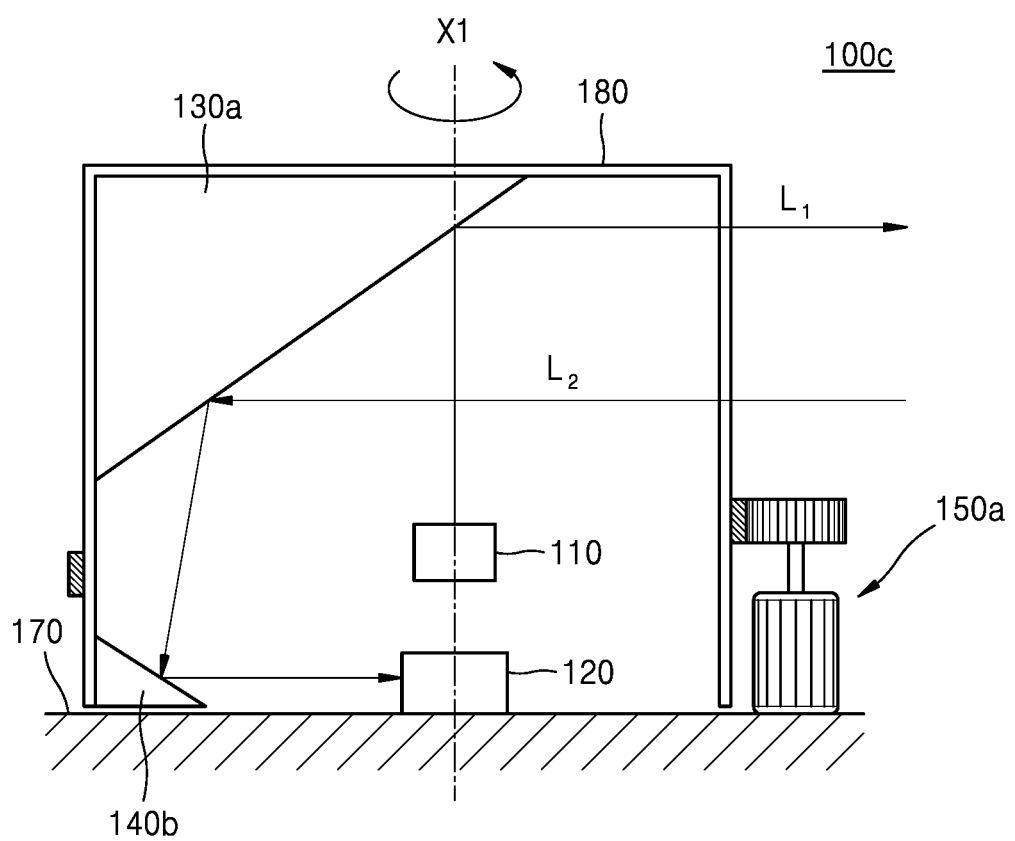
FIG. 6 is a diagram illustrating an example LIDAR device according to yet another embodiment of the disclosure.

FIG. 6 is a diagram illustrating an example LIDAR device 100c according to yet another embodiment of the disclosure. Comparing FIG. 4 with FIG. 6, a driving member 150a may be arranged outside the housing 180. A diverging member 130a may perform a function of a converging member. A reflective surface of the diverging member 130a of FIG. 6 is larger in size than the reflective surface of the diverging member 130 of FIG. 4. Therefore, the second light beam L2 reflected or scattered by the object 11 may be incident on the diverging member 130a. The diverging member 130a may reflect the second light beam L2 incident thereon toward the lower portion of the housing 180.

A converging member 140b may be arranged in the lower portion of the housing 180. The converging member 140b may be a reflector reflecting a light beam incident thereon from the diverging member 130a and thus causing the light beam to be incident on the photodetector 120. The reflective surface of the diverging member 130a may be in a complementary relation to a reflective surface of the converging member 140b. Therefore, the reflective surface of the diverging member 130a may reflect a light beam, which is incident thereon from a lateral direction, toward the lower portion of the housing 180, and the converging member 140b may reflect the light beam, which is incident thereon from the diverging member 130a, in the lateral direction and apply the light beam to the photodetector 120.

The converging member 140b may also be arranged in contact with the side surface of the housing 180. Therefore, the diverging member 130a and the converging member 140b may be simultaneously rotated by the driving member 150. However, the disclosure is not limited thereto. The converging member 140b may also have a ring shape that is symmetrical about the rotation axis X1, and may be fixed to the base plate 170. Therefore, the converging member 140b may reflect the light beam, which is incident thereon from the diverging member 130a, to the photodetector 120 regardless of the rotation of the diverging member 130a. The central axes X2 of both the light source 110 and the photodetector 120 may be consistent with the rotation axis X1 of the diverging member 130a. For example, the photodetector 120 may be fixed on the base plate 170, and the light source 110 may be fixed over the photodetector 120 by a cylinder (not shown) or the like.

The light source 110 and the photodetector 120 may perform an omnidirectional scan by rotating at least one of optical elements, for example, the diverging member (for example, 130 or 130a) or the converging member (for example, 140a or 140b) while the light source 110 and the photodetector 120 are fixed. Therefore, a slip-ring according to the rotation of the light source 110 or the photodetector 120 may not be required, and thus, the durability may be improved. In addition, because both the diverging member (for example, 130 or 130a) and the converging member (for example, 140a or 140b) are rotated by rotating the housing 180, the driving member 150 may be simplified and the cost of the driving member 150 may be reduced.

Because the light source 110 and the diverging member 130 transmit a light beam to the object 11, the light source 110 and the diverging member 130 may be collectively referred to as a light transmission stage, and the photodetector 120 and the converging member 140 may be collectively referred to as a light reception stage receiving a light beam from the object 11. Each of the light transmission stage and the light reception stage may further include other optical elements in addition to a reflective plate.

Figure 7:
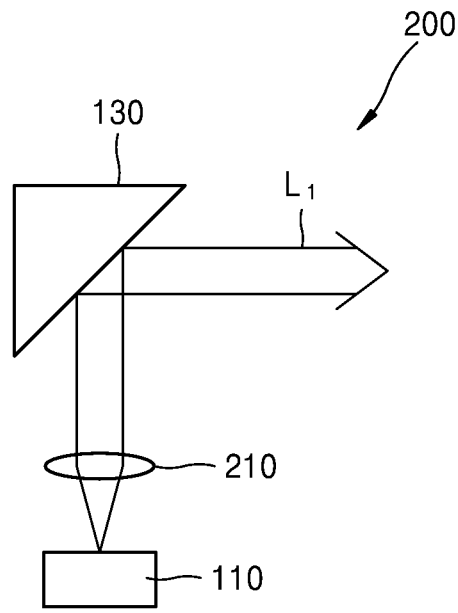
FIG. 7 is a diagram illustrating an example light transmission stage according to another embodiment of the disclosure.

FIG. 7 is a diagram illustrating an example light transmission stage 200 according to another embodiment of the disclosure. As shown in FIG. 7, a collimating lens 210 may be arranged between the light source 110 and the diverging member 130. The first light beam L1 emitted from the light source 110 is output as a parallel light beam as the first light beam L1 passes through the collimating lens 210. The parallel light beam may be incident on the diverging member 130 and reflected in a lateral direction. Because the parallel light beam is maintained as a parallel light beam even when reflected by the diverging member 130, the parallel light beam may be useful in recognizing an object located at a certain height from the floor.

Figure 8:
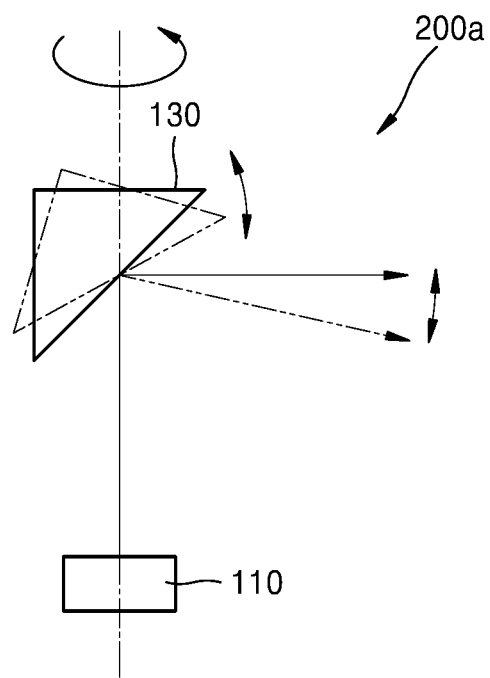
FIG. 8 is a diagram illustrating an example optical path according to a change in tilt angle according to an embodiment of the disclosure.

To recognize an object located at various heights, the diverging member may make a tilt movement as well as a rotational movement. FIG. 8 is a diagram illustrating an optical path according to a change in tilt angle of an example light transmission stage 200a, according to an embodiment of the disclosure. As shown in FIG. 8, when the tilt angle of the reflective surface of the diverging member 130 is changed, because an incident angle of the first light beam L1 incident thereon from the light source 110 is changed, a reflection angle of the first light beam L1 is also changed. Therefore, a light beam may be diverged to positions at various heights. The diverging member 130 may make a change in tilt angle at every one rotation thereof or may alternately make a change in tilt angle and a change in rotation angle. The driving member 150 may include a first driving member (not shown) configured to rotate the diverging member 130, and a second driving member (not shown) configured to make a tilt movement of the diverging member 130. The second driving member may be a motor connected in a perpendicular direction to a rotation axis thereof, and the tilt angle of the diverging member 130 may be changed by a swing movement of the motor.

Figure 9:
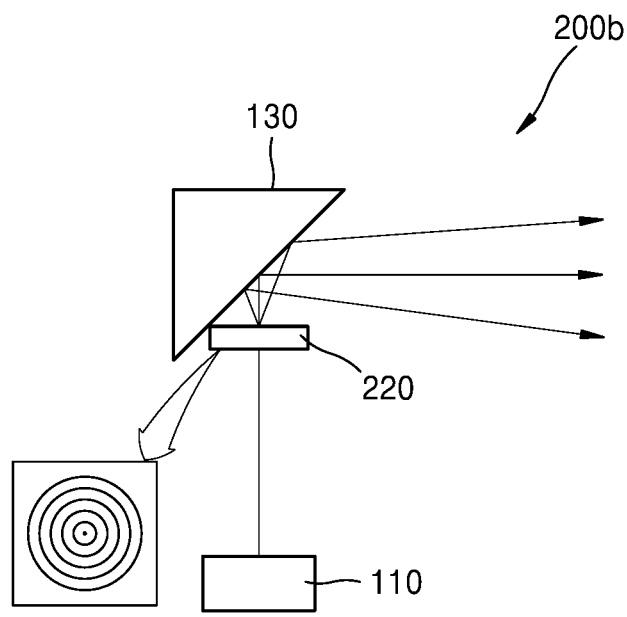
FIG. 9 is a diagram illustrating an example light transmission stage including a diffuser, according to an embodiment of the disclosure.

To recognize an object located at various heights, the LIDAR device according to an embodiment of the disclosure may further include a diffuser. FIG. 9 is a diagram illustrating an example light transmission stage 200b including a diffuser 220, according to an embodiment of the disclosure. As shown in FIG. 9, the light transmission stage 200b may further include the diffuser 220 between the light source 110 and the diverging member 130. The diffuser 220 may include, for example, and without limitation, a diffractive optical element (DOE) lens capable of emitting light beams in several circular shapes. The diffuser 220 may diffuse the first light beam L1 incident thereon from the light source 110 and thus cause the first light beam L1 to be incident on the diverging member 130. The diverging member 130 of FIG. 9 may cause a larger space to be irradiated with the first light beam L1, which is reflected by the diverging member 130 of FIG. 9, than the diverging member 130 of FIG. 1.

Figure 10:
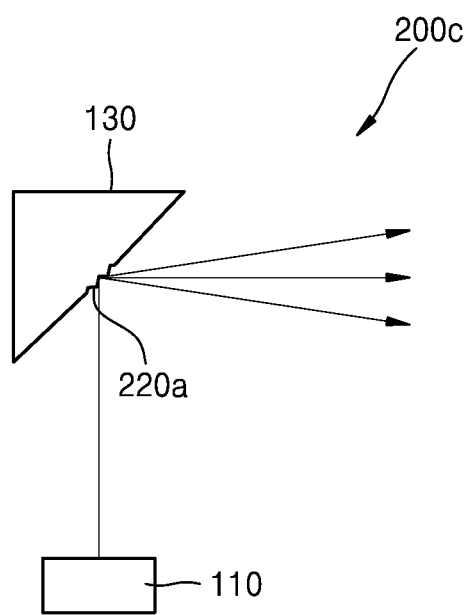
FIG. 10 is a diagram illustrating an example light transmission stage including a diffuser, according to another embodiment of the disclosure.

FIG. 10 is a diagram illustrating an example light transmission stage 200c including a diffuser 220a, according to another embodiment of the disclosure. As shown in FIG. 10, the diffuser 220a may be arranged on the reflective surface 131 of the diverging member 130. The diffuser 220a may include a grating structure. The first light beam L1 emitted from the light source 110 may be incident on the diffuser 220a on the diverging member 130, undergo reflection and diffusion, and be emitted outwards.

Figure 11:
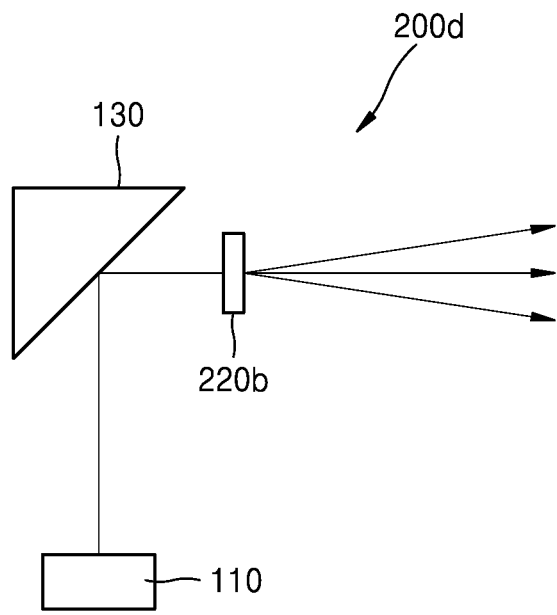
FIG. 11 is a diagram illustrating an example light transmission stage including a diffuser, according to another embodiment of the disclosure.

FIG. 11 is a diagram illustrating an example light transmission stage 200d including a diffuser 220b, according to another embodiment of the disclosure. The diffuser 220b shown in FIG. 11 may be arranged on a lateral side of the diverging member 130. Therefore, the first light beam L1 emitted from the light source 110 may be reflected by the diverging member 130 and then diffused by the diffuser 220b. The first light beam L1 diffused by the diffuser 220b may be irradiated to external spaces with various heights.

Heretofore, methods of emitting a light beam in various directions using one light source 110 have been described. However, a light beam may be emitted in various directions only when the diverging member 130 completely makes one rotation. When the light source 110 is provided in a plural number, a light beam may be emitted in various directions even when the diverging member 130 does not completely make one rotation.

Figure 12A:
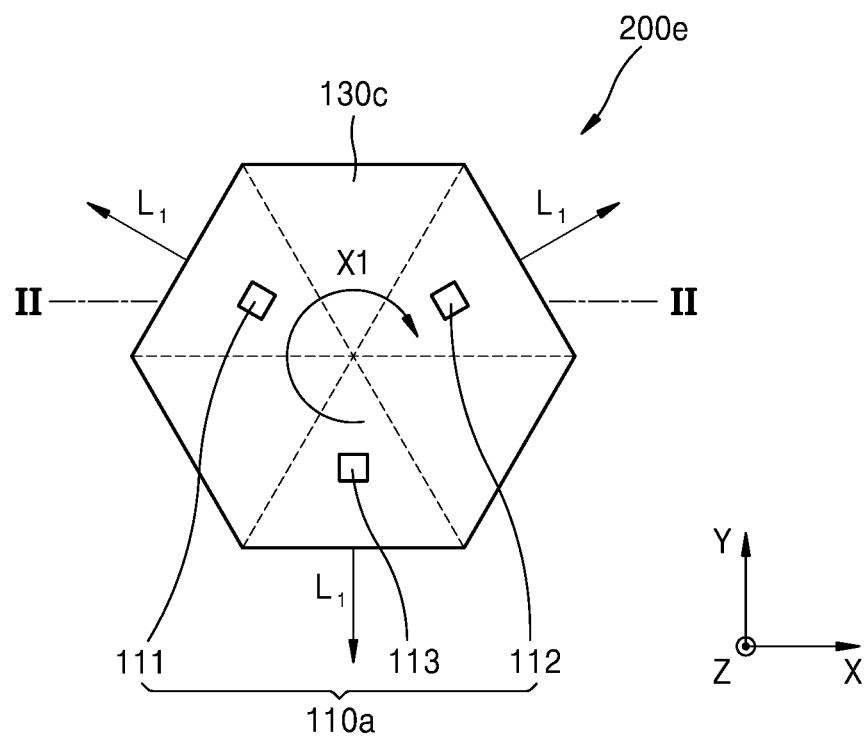
FIG. 12A is a diagram illustrating an example light transmission stage including a plurality of light sources, according to an embodiment of the disclosure.
Figure 12B:
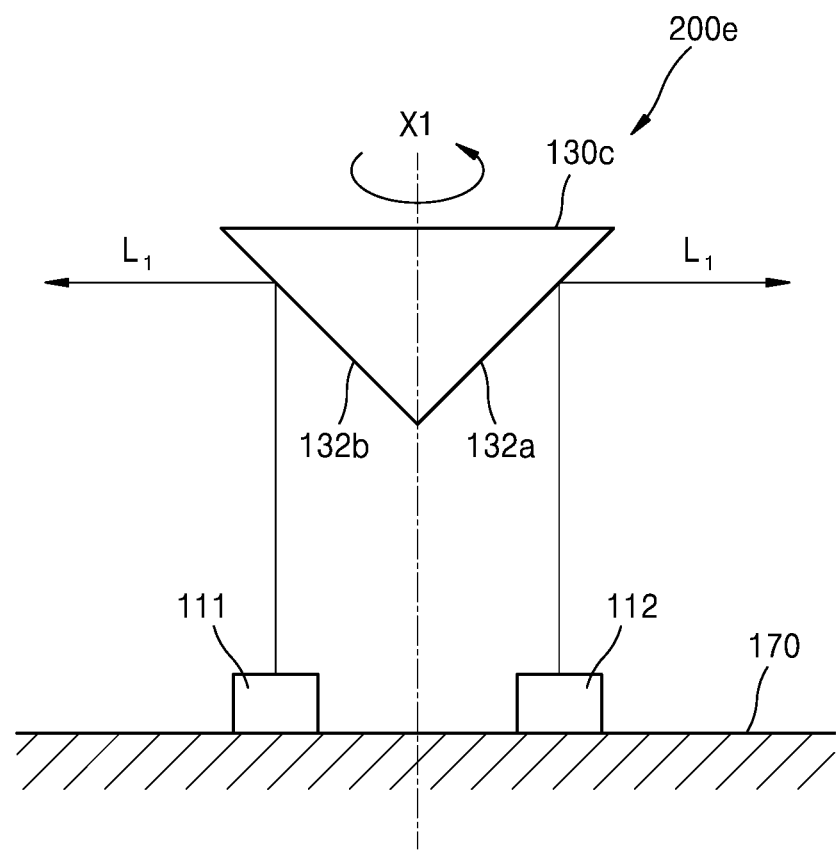
FIG. 12B is a diagram illustrating an example light transmission stage including a plurality of light sources, according to an embodiment of the disclosure.

FIG. 12A is a diagram illustrating an example light transmission stage 200e including a plurality of light sources, according to an embodiment of the disclosure, and FIG. 12B is a diagram illustrating the example light transmission stage 200e including a plurality of light sources, according to an embodiment of the disclosure. As shown in FIGS. 12A and 12B, the light transmission stage 200e may include a plurality of light sources 110a, for example, first to third light sources 111, 112, and 113. The first to third light sources 111, 112, and 113 may be fixed to the base plate 170 and may be arranged symmetrically about a rotation axis X1 of a diverging member 130c.

The diverging member 130c may be arranged over the first to third light sources 111, 112, and 113. The diverging member 130c may include a plurality of reflective surfaces 132a and 132b collectively having a tapered shape which has a decreasing width from top toward bottom. Therefore, the diverging member 130c may diverge light beams incident thereon from the first to third light sources 111, 112, and 113 in lateral directions.

A cross-section of the diverging member 130c may have a polygonal shape, and each of the reflective surfaces 132a and 132b of the diverging member 130c may also have a polygonal shape. For example, each of the reflective surfaces 132a and 132b may have a triangular shape or a width-decreasing quadrangular shape. In addition, the diverging member 130c may have a symmetrical shape about the rotation axis X1. In FIGS. 12A and 12B, the diverging member 130c having a hexagonal cross-section, and three light sources (for example, 111, 112, and 113) are illustrated. However, the disclosure is not limited thereto. The diverging member 130c may have a polygonal truncated-pyramid or pyramid shape that is equal to or above a trigonal truncated-pyramid or pyramid shape, and the number of light sources may be two. For example, when the diverging member 130c has a hexagonal pyramid shape and the number of light sources is three, a LIDAR device may perform an omnidirectional scan even when the diverging member 130c makes a 120-degree rotation.

Figure 13:
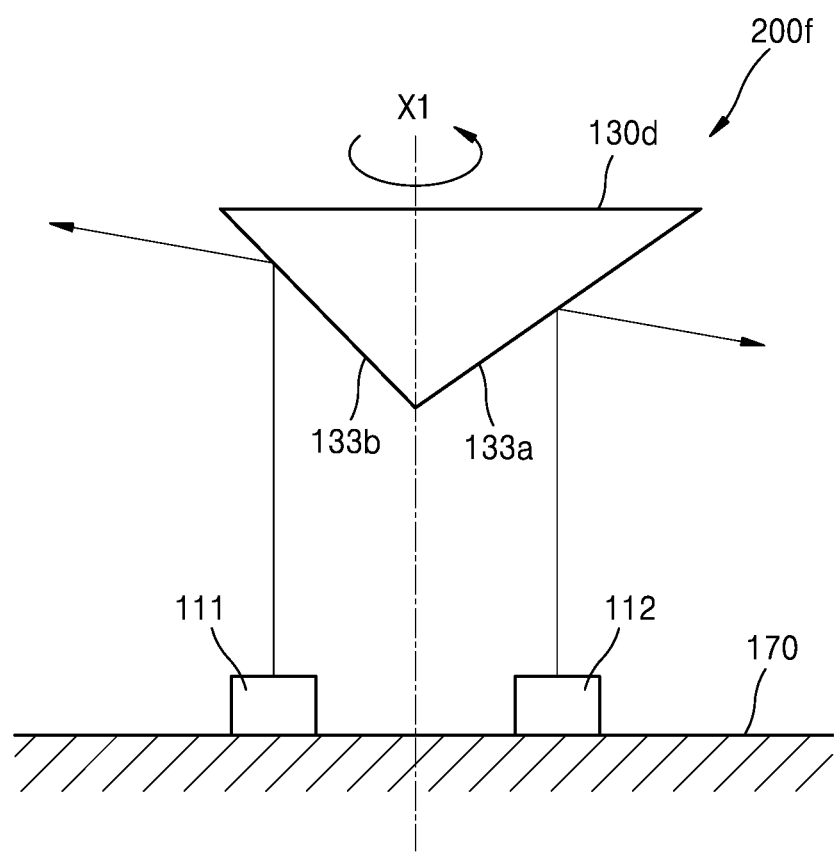
FIG. 13 is a diagram illustrating an example light transmission stage including an asymmetrical type diverging member according to an embodiment of the disclosure.

In addition, to recognize objects at various heights, a diverging member may include a plurality of reflective surfaces which are asymmetrical with respect to the rotation axis X1. FIG. 13 is a diagram illustrating an example light transmission stage 200f including an asymmetrical type diverging member 130d, according to an embodiment of the disclosure. As shown in FIG. 13, the diverging member 130d may include first and second reflective surfaces 133a and 133b having different tilt angles with respect to the rotation angle X1. Reflection angles of light beams reflected by the reflective surfaces 133a and 133b after light entrance thereto vary according the tilt angles thereof. In addition, as the diverging member 130d rotates, a light beam may be emitted to positions at various heights.

Heretofore, the LIDAR device emitting a light beam in all lateral directions has been described. The LIDAR device according to an embodiment of the disclosure may be applied, for example, to a robotic vacuum cleaner. By recognizing an object using the LIDAR device, the robotic vacuum cleaner may generate a map or recognize a current position on a map.

The light source and the detector may perform a light-beam scan in various directions by rotating only an optical element while being fixed.

Because the omnidirectional scan may be made while the light source or the photodetector is fixed, the durability of the LIDAR device may be improved.

It will be understood that many embodiments other than the foregoing embodiments of the disclosure may be implemented without departing from the spirit and scope of the disclosure. Although various example embodiments of the disclosure have been illustrated and described with reference to the accompanying drawings, it should be understood that the disclosure may be embodied in different ways and various modifications and changes can be made without departing from the spirit and scope of the disclosure. In addition, it should be understood that the various example embodiments of the disclosure are provided for illustrative purposes only and are not to be understood in any way as limiting the disclosure, and that all modifications, changes, and equivalent embodiments, which may be implemented without departing from the spirit and scope of the disclosure, fall within the scope of the disclosure.

What is claimed is:

1. A light detection and ranging (LIDAR) device comprising:
   a light source configured to emit a first light beam;
   a photodetector configured to detect a second light beam, the second light beam being a reflected or scattered light beam of the first light beam reflected or scattered by an object;
   a diverging member comprising a reflective surface configured to diverge the first light beam in omnidirection by rotating about a rotation axis, the first light beam being incident on the diverging member from the light source;
   a converging member comprising an optical element including one or more of a reflective material configured to converge the second light beam from the object and configured to cause the second light beam to be incident on the photodetector; and
   a processor configured to obtain location information of the object using a detection result of the photodetector, wherein the converging member comprises:
      a first reflector arranged on a side surface of a housing and configured to reflect the second light beam toward a lower portion of the housing;
      a second reflector arranged under the first reflector and configured to reflect the second light beam to an internal space of the housing, the second light beam being incident on the second reflector from the first reflector; and
      a third reflector arranged in the internal space of the housing and configured to reflect the second light beam to the photodetector, the second light beam being incident on the third reflector from the second reflector.

2. The LIDAR device of claim 1, wherein the reflective surface is asymmetrical with respect to the rotation axis.

3. The LIDAR device of claim 2, wherein the reflective surface is tilted at a certain angle with respect to the rotation axis, and the first light beam is incident on the reflective surface and parallel to the rotation axis.

4. The LIDAR device of claim 1, wherein the photodetector is arranged on the rotation axis and is configured to remain fixed while the diverging member rotates.

5. The LIDAR device of claim 1, further comprising: a driving member comprising a motor configured to rotate the diverging member.

6. The LIDAR device of claim 5, wherein the housing further comprises a top surface, the top surface contacting the diverging member, and the side surface contacting the driving member.

7. The LIDAR device of claim 6, wherein the driving member comprises:
   a motor;
   a first gear connected to the motor and configured to be rotated by the motor; and
   a second gear arranged on the side surface of the housing and configured to rotate the housing based on a rotation of the first gear while being engaged with the first gear.

8. The LIDAR device of claim 6, wherein the light source, the photodetector, the diverging member, and the converging member are arranged in the internal space of the housing.

9. The LIDAR device of claim 6, wherein the housing includes a portion comprising a transparent material.

10. The LIDAR device of claim 1, wherein the third reflector and the photodetector are arranged on the rotation axis.

11. The LIDAR device of claim 1, wherein the first reflector is configured to rotate in correspondence with the diverging member, and the third reflector is fixed in correspondence with the photodetector.

12. The LIDAR device of claim 1, wherein the processor is further configured to:
   determine at least one of a direction of the object, a height of the object, or a distance to the object, the direction of the object based on a rotation direction of a reflective surface of the diverging member, the height of the object based on a tilt angle of the reflective surface of the diverging member, and the distance to the object based on detection time for the photodetector to detect the second light beam.

* * * * *